United States Patent
Tachibana et al.

(10) Patent No.: US 6,590,862 B1
(45) Date of Patent: Jul. 8, 2003

(54) LINE INTERFACING APPARATUS WITH N+1 CONFIGURATION

(75) Inventors: Yamato Tachibana, Yokohama (JP); Takashi Yokoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/382,254

(22) Filed: Aug. 24, 1999

(30) Foreign Application Priority Data

Aug. 25, 1998 (JP) .......................................... 10-238495

(51) Int. Cl.[7] .............................................. G01R 31/08
(52) U.S. Cl. ........................ 370/216; 370/217; 370/218
(58) Field of Search ................................. 370/216, 217, 370/218, 225, 226, 229, 16; 710/301, 302; 379/219, 220, 221.04; 709/223

(56) References Cited

U.S. PATENT DOCUMENTS 5,345,438 A * 9/1994 Ozaki ........................... 370/16
5,570,344 A * 10/1996 Fujii ............................. 370/16
5,796,717 A * 8/1998 Shinbashi ................... 370/216
6,233,610 B1 * 5/2001 Hayball ....................... 709/223

FOREIGN PATENT DOCUMENTS

JP  62-20447   1/1987
JP  2-130660   5/1990

* cited by examiner

*Primary Examiner*—Douglas Olms
*Assistant Examiner*—Robert W. Wilson
(74) *Attorney, Agent, or Firm*—Katten Muchen Zavis Rosenman

(57) ABSTRACT

A line interfacing apparatus has terminating units connected to lines, a spare terminating unit, a line selector for connecting one of the lines to the spare terminating unit, and a termination controller. The termination controller has switches for switching connections between the terminating units and a switching unit of a higher apparatus. If any one of the terminating units fails, the line selector is controlled to switch the line connected to the failed terminating unit to the spare terminating unit. At the same time, the switches of the termination controller are controlled to supply signals from the spare terminating unit, instead of signals from the failed terminating unit, to the switching unit of the higher apparatus.

6 Claims, 5 Drawing Sheets

LINE INTERFACING APPARATUS WITH N+1 CONFIGURATION

BACKGROUND OF THE INVENTION

1. Field of the Invention

The present invention relates to an interfacing apparatus having regular units, a spare unit, and a selector for replacing one of the regular units with the spare unit. In particular, the present invention relates to a line interfacing apparatus with an N+1 configuration employing N regular units and a spare unit applicable to an electronic exchange.

2. Description of the Related Art

A system with an N+1 configuration having N regular units and a spare unit is capable of continuing a normal operation even if one of the regular units fails by replacing the failed regular unit with the spare unit. To achieve this, a higher apparatus connected to the N+1-configuration system must have switches for the N regular units and spare unit and must identify a failed one among the regular units to run usual- and failure-operation programs. This puts a heavy load on the higher apparatus.

FIG. 1 shows a line interfacing apparatus 81 with an N+1 configuration for an electronic exchange according to a prior art. The apparatus 81 handles external lines (or relay lines) 88 and is connected to a higher apparatus 80 having a switching unit and to an opposite apparatus 89 through the lines 88. The lines 88 are divided into line groups 88-1 to 88-n each consisting of four lines in this example. The line groups 88-1 to 88-n are connected to terminating units 82-1 to 82-n (DT1 to DTn), respectively. Each of the terminating units has a multiplexer (MUX) for terminating and multiplexing the four lines. A multiplexed signal from each terminating unit is transmitted to a controller 87 through a channel 83. If one of the terminating units fails, a line selector (DTSW) 84 selects the line group connected to the failed terminating unit, and output lines of the line selector 84 are terminated and multiplexed by a spare terminating unit (MDT) 85. A multiplexed signal from the spare terminating unit 85 is transmitted to the controller 87 through a channel 86. The controller 87 has a multiplexer for multiplexing the multiplexed signals from the terminating units and a demultiplexer (DEMUX) for demultiplexing a multiplexed signal from the higher apparatus 80.

In this example, each of the line groups 88-1 to 88-n consists of four lines. For example, the line group 88-1 is made of lines 88-11 to 88-14 and the line group 88-n is made of lines 88-n1 to 88-n4. The line groups 88-1 to 88-n are connected to the terminating units 82-1 to 82-n, respectively and to the line selector 84. Each of the, terminating units 82-1 to 82-n has four relay contacts to connect and disconnect the four lines. For example, the terminating unit 82-1 has relay contacts RL011 to RL014 to connect and disconnect the lines 88-11 to 88-14, respectively, and the terminating unit 82-n has relay contacts RL0n1 to RL0n4 to connect and disconnect the lines 88-n1 to 88-n4, respectively. The line selector 84 has relay contacts RL111 to RL1n1 up to RL114 to RL1n4.

If one of the terminating units fails, the controller 87 opens the four relay contacts of the failed terminating unit and closes the relay contacts of the line selector 84 corresponding to the line group connected to the failed terminating unit. For example, if the terminating unit 82-1 (DT1) connected to the line group 88-1 fails, the controller 87 connects the line. group 88-1 to the spare terminating unit 85 through the line selector 84 and disconnects the line group 88-1 from the failed terminating unit 82-1.

Signals transmitted through the lines of each line group include main signals that are usually voice signals and control signals including subscriber status signals, select signals, and a failure notice signal. Each of the terminating units 82-1 to 82-n separately handles the main signals and control signals. Namely, each terminating unit multiplexes the main signals and control signals into separate multiplexed signals, which are transmitted to the higher apparatus 80 through separate channels. The spare terminating unit 85 has its own channels for main signals and control signals. If one of the terminating units fails, the failed terminating unit is switched to the spare terminating unit 85 through the line selector 84. At this time, the switching unit of the higher apparatus 80 must switch a path for the main signals passing through the failed terminating unit to a path passing through the spare terminating unit 85, and the controller 87 must handle control signals for the spare terminating unit 85 as control signals for the failed terminating unit.

In this way, the line interfacing apparatus of the prior art prepares a spare unit (the line selector 84 and spare terminating unit 85) for regular units (the terminating units 82-1 to 82-n). If one of the regular units fails, the prior art switches the failed unit to the spare unit while taking care of the switching of main signals, control signals, and failure signals. The prior art connects these signals to a higher apparatus through the regular and spare units. Namely, the spare unit always occupies some of signal channels between the interfacing apparatus and the higher apparatus, thereby deteriorating the efficiency of use of the signal channels.

When switching a regular unit to the spare unit, a higher controller installed in the higher apparatus sends a switching signal to the interfacing apparatus. Thereafter, control signals and a failure signal of the failed unit are replaced with those of the spare unit. The higher controller must correctly read these signals. To achieve this, the higher controller must manage the switching states of the regular and spare units, and once a regular unit fails and is switched to the spare unit, must identify the failed unit. The higher controller is usually controlled by software. The prior art requires a large software because the higher unit must switch line numbers for control signals not only for a maintenance program for handling the failed unit switching operation but also for a regular program for handling calls.

SUMMARY OF THE INVENTION

An object of the present invention is to provide a line interfacing apparatus with an N+1 configuration capable of improving the efficiency of use of channels between the interfacing apparatus and a higher apparatus.

Another object of the present invention is to reduce the size of software which operates a spare unit of the interfacing apparatus.

In order to accomplish the objects, the present invention provides a line interfacing apparatus with an N+1 configuration. The apparatus has N regular terminating units for terminating lines, respectively. Each of the regular terminating units has an end connected to an opposite apparatus through a corresponding one of the lines and another end connected to a higher apparatus having a switching unit. The interfacing apparatus further has at least one spare terminating unit, a line selector for selecting one of the lines and connecting the selected line to the spare terminating unit, and a termination controller having switches for switching channels between the regular and spare terminating units and the switching unit of the higher apparatus. If any one of the regular terminating units fails, the line selector is controlled to switch the line connected to the failed terminating unit to the spare terminating unit, and the switches of the termination controller are controlled to connect signals of the spare terminating unit, in place of signals of the failed terminating unit, to the switching unit of the higher apparatus.

With this arrangement, the line selector switches the line connected to the failed terminating unit to the spare terminating unit, and the output of the spare terminating unit is connected to an output channel of the failed terminating unit. As a result, channels for the spare terminating unit among channels for multiplexed signals between the interfacing apparatus and the higher apparatus are not always occupied. This improves the efficiency of use of channels.

Since the output of the spare terminating unit is connected to a terminal of the higher apparatus corresponding to the failed terminating unit, the higher apparatus is not required to have special software for reading the output of the spare terminating unit as the output of the failed terminating unit. This reduces load to form the software of the higher apparatus.

DESCRIPTION OF THE PREFERRED EMBODIMENTS

Figure 1:
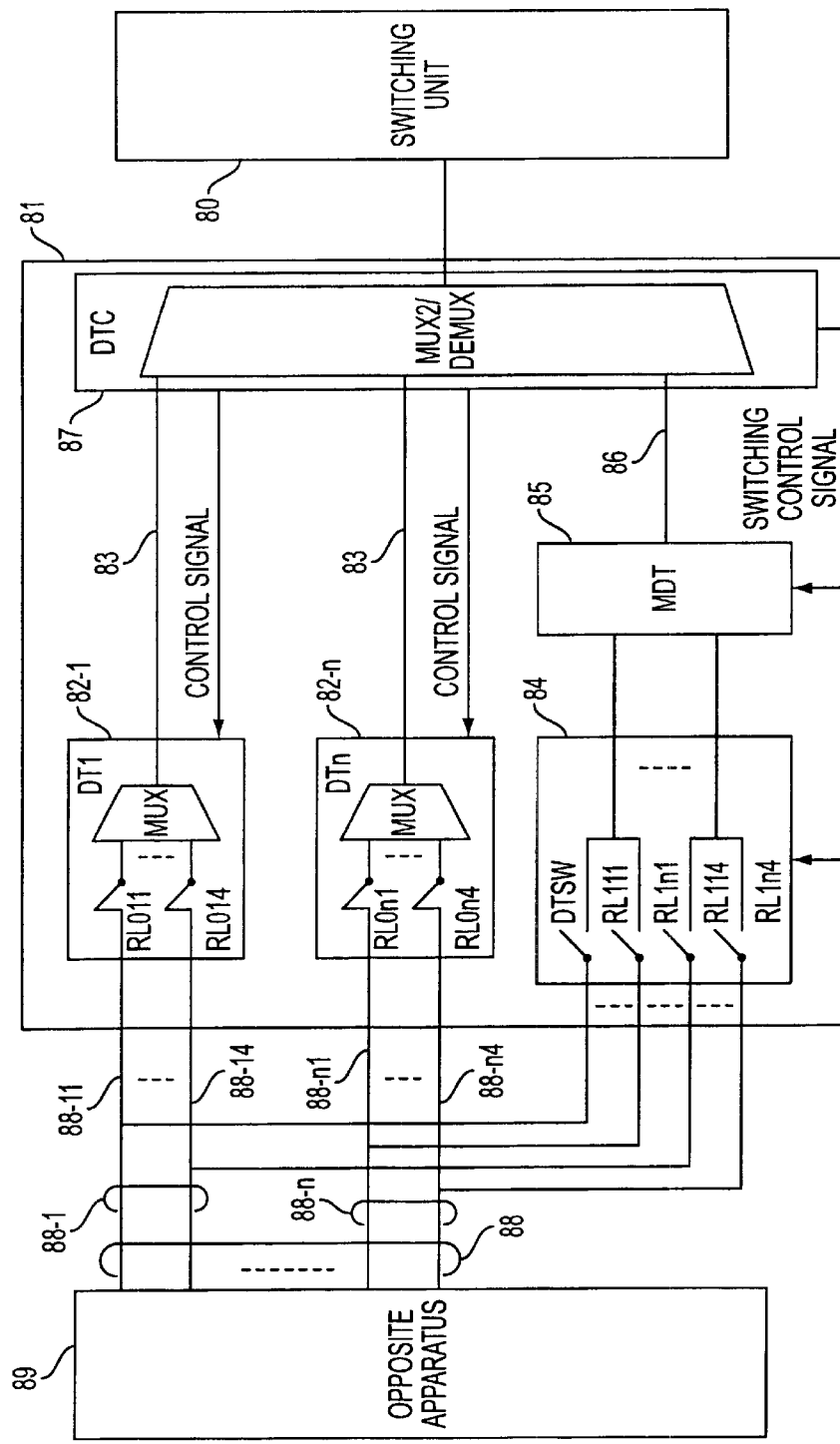
FIG. 1 shows a line interfacing apparatus according to a prior art.
Figure 2:
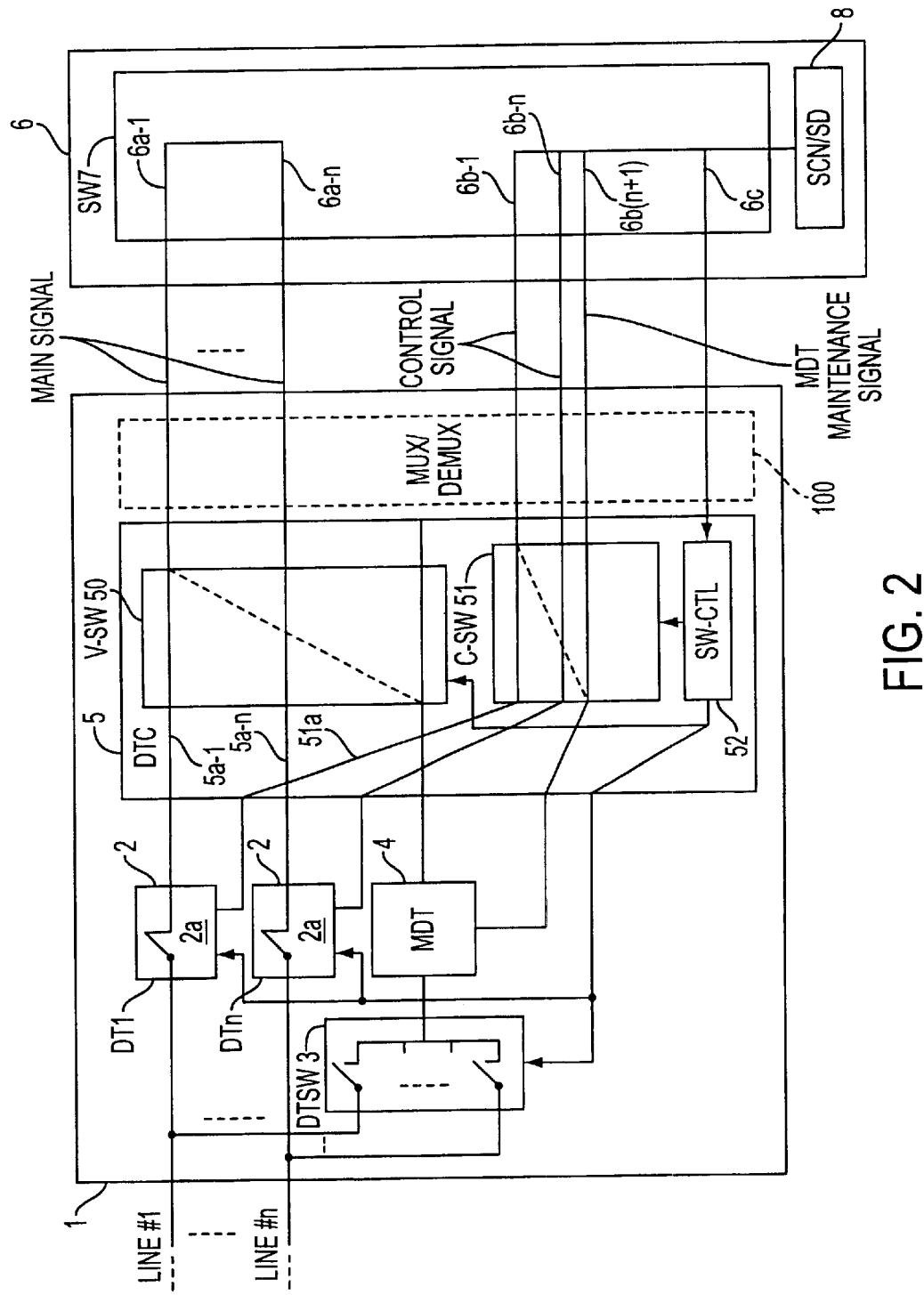
FIG. 2 shows a line interfacing apparatus according to a first embodiment of the present invention.

FIG. 2 shows a line interfacing apparatus 1 with an N+1 configuration according to the first embodiment of the present invention. The interfacing apparatus 1 handles lines #1 to #n. The lines #1 to #n are terminated by terminating units 2 (DT1 to DTn), respectively. Each of the terminating units has a switch 2a to be opened and closed in response to a control signal from a termination controller 5. A line selector (DTSW) 3 connects one of the lines #1 to #n to a spare terminating unit (MDT) 4. The termination controller 5 has a main signal switch (V-SW) 50 for passing main signals (voice signals) between the terminating units and a switching unit (SW) 7 of a higher apparatus 6, a control signal switch (C-SW) 51 for passing control signals between the terminating units and the switching unit 7, and a switch controller (SW-CTL) 52 for controlling the switches 50 and 51. The higher apparatus 6 has the switching unit 7 and a controller (SCN/SD) 8 for collecting or scanning control signals from the lines, outputting control signals to the lines, and distributing control signals to the switch controller 52.

To clearly show the concept of signal communication between the interfacing apparatus 1 and the higher apparatus 6, FIG. 2 shows that signals are transferred through separate lines. In practice, the signals are multiplexed by a multiplexer-demultiplexer 100 indicated with a dotted line in FIG. 2, and multiplexed signals are transferred between the apparatuses 1 and 6. Although each terminating unit 2 has only the switch 2a in FIG. 2, it actually has other functional devices such as a multiplexer.

The lines #1 to #n are usually connected to the terminating units 2 in, the interfacing apparatus 1. Each line transmits a main signal (a voice signal) and a control signal, which are separated by the terminating unit 2 and are supplied to the main signal switch 50 and control signal switch 51, respectively. The outputs of the switches 50 and 51 are transferred to the switching unit 7 of the higher apparatus 6. The main signals switched by the controller 8 of the higher apparatus 6 to an opposite party, and the control signal is transferred to the controller 8 through the switching unit 7. The controller 8 issues control signals to the lines #1 to #n.

If one of the terminating units 2 fails, the failed terminating unit sends a control signal to inform the controller 8 of the hardware failure with the type of the failure and a hardware identifier for the failed terminating unit. Based on the control signal, the controller 8 detects the failure. The hardware failure and hardware identifier may be transmitted to the controller 8 through specific time slots in multiplexed signal channels between the switches 50 and 51 and the switching unit 7. The failure information is handled separately from usual control signals and is not switched to another channel even if the failed terminating unit is replaced with the spare terminating unit 4. As a result, switching control software easily determines the physical position of the failed terminating unit even after the failed terminating unit is switched to the spare terminating unit 4.

In this way, the information about the failed terminating unit is transmitted to the higher apparatus 6. For example, if the terminating unit DT1 fails, the controller 8 sends a switching signal 6c to the switch controller 52. The switch controller 52 issues a control signal to make the line selector 3 select the line #1 connected to the failed terminating unit DT1 and open the switch 2a of the failed terminating unlit DT1. As a result, the line #1 is connected to the spare terminating unit 4. The spare terminating unit 4 supplies a main signal in the line #1 to a terminal n+1 of the main signal switch 50 and a control signal in the line #1 to a terminal n+1 of the control signal switch 51. The switch controller 52 issues control signals to the main signal switch 50 and control signal switch 51 so that the main signal and control signal from the spare terminating unit 4 serve as the main signal and line control signal of the line #1.

The switches 50 and 51 may each be a times switch (a multiplexing switch) to replace a time slot with another. The switching unit 7 of the higher apparatus 6 may also be a times switch.

Even with the failed terminating unit DT1, the controller 8 of the higher apparatus 6 can manage the main and control signals carried by the line #1 without any change in its own interface before and after the failure of the terminating unit DT1. Namely, the controller 8 can handle the signals in the line #1 as usual without putting extra load on the higher unit of the controller 8.

Figure 3:
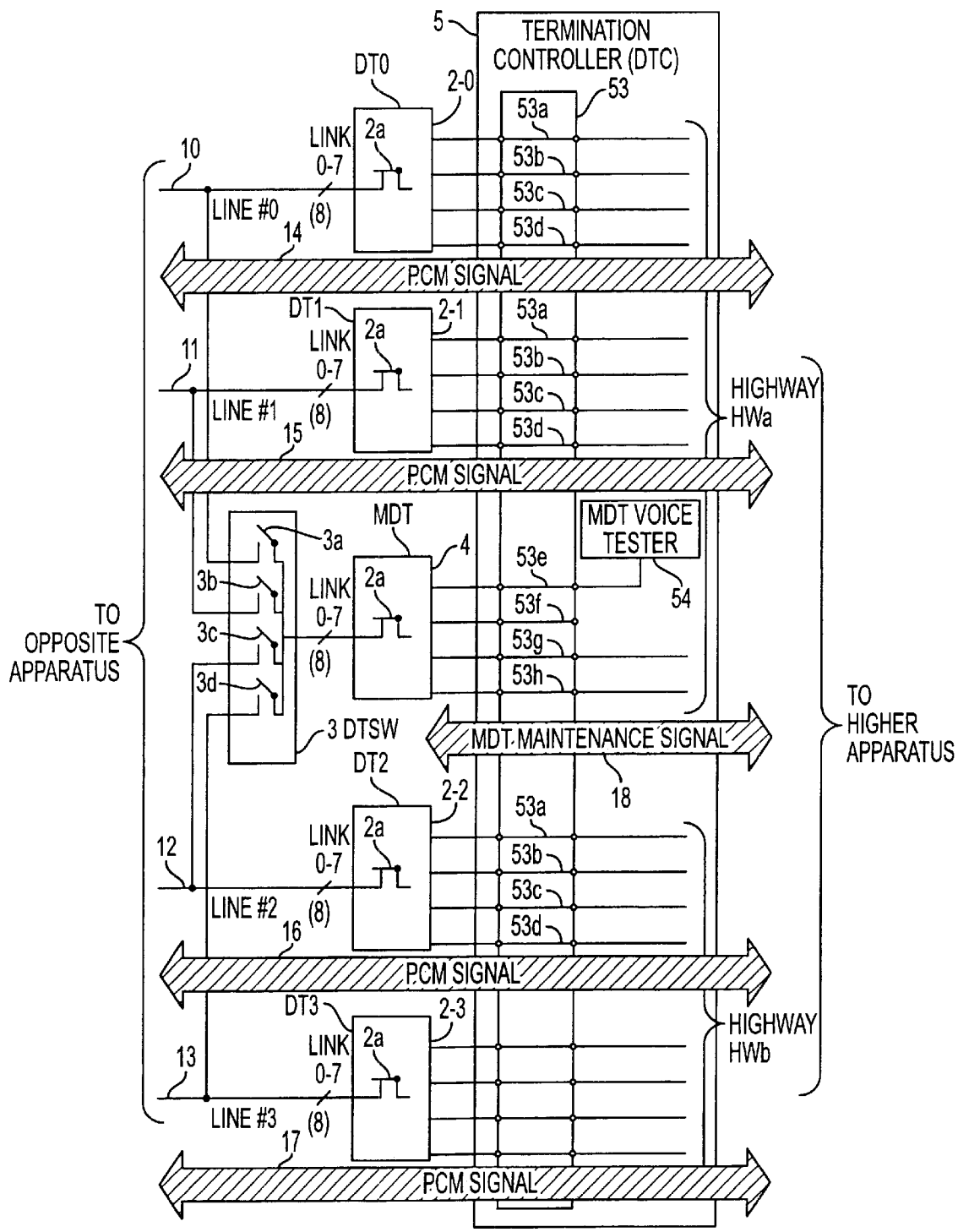
FIG. 3 shows a line interfacing apparatus according to a second embodiment of the present invention.

FIG. 3 shows a line interfacing apparatus with an N+1 configuration according to a second embodiment of the present invention.

This apparatus handles. PCM (pulse code modulation) lines of an exchange. The apparatus has four terminating units (DT0 to DT3) 2-0 to 2-3, a line selector (DTSW) 3 for switching a line connected to a failed terminating unit to a spare terminating unit (MDT) 4, and a termination controller 5. The line selector 3 has ON/OFF contacts 3a to 3d connected to lines 10 to 13 (#0 to #3) that are connected to the terminating units 2-0 to 2-3, respectively. The termination controller 5 has a switch 53 for switching main signals (voice signals) and control signals and a voice tester 54 for the spare terminating unit 4. The switch 53 provides the functions of both the main signal switch 50 and control signals witch 51 of FIG. 2. The lines 10 to 13 consist each of eight links 0 to 7 and extend to an opposite apparatus. The lines 10 to 13 transmit PCM signals 14 to 17 containing main and control signals. A maintenance signal 18 for the spare terminating unit 4 is transferred between the unit 4 and a controller 8 (FIG. 2) of a higher apparatus 6 (FIG. 2).

Channels 53a to 53d corresponding to different time positions are arranged from each of the terminating units 2-0 to 2-3 to a switching unit 7 (FIG. 2) of the higher, apparatus 6 through the switch 53. The channel 53a transmits a voice signal, the channel 53b a notification signal communicating with the opposite apparatus, the channel 53c a line failure signal including an alarm signal to notify a line failure to the controller 8 and a maintenance signal from the controller 8 to the terminating unit to connect or disconnect the corresponding line, and the channel 53d a package failure signal including an alarm signal to indicate a package (PWCB, i.e., package wired line board) failure and a package maintenance signal issued by the controller 8 to change a package. Channels 53e to 53h are arranged from the spare terminating unit 4 to the switching unit 7 of the higher apparatus 6 through the switch 53. The channel 53e transmits a voice signal, the channel 53f a notification signal terminated by the switch 53, the channel 53g a signal issued by the controller 8 to recognize the operation of the spare terminating unit 4, and the channel 53h a package failure signal including an alarm signal indicating a package failure and a package maintenance signal issued by the controller 8 to change a package.

Figure 4:
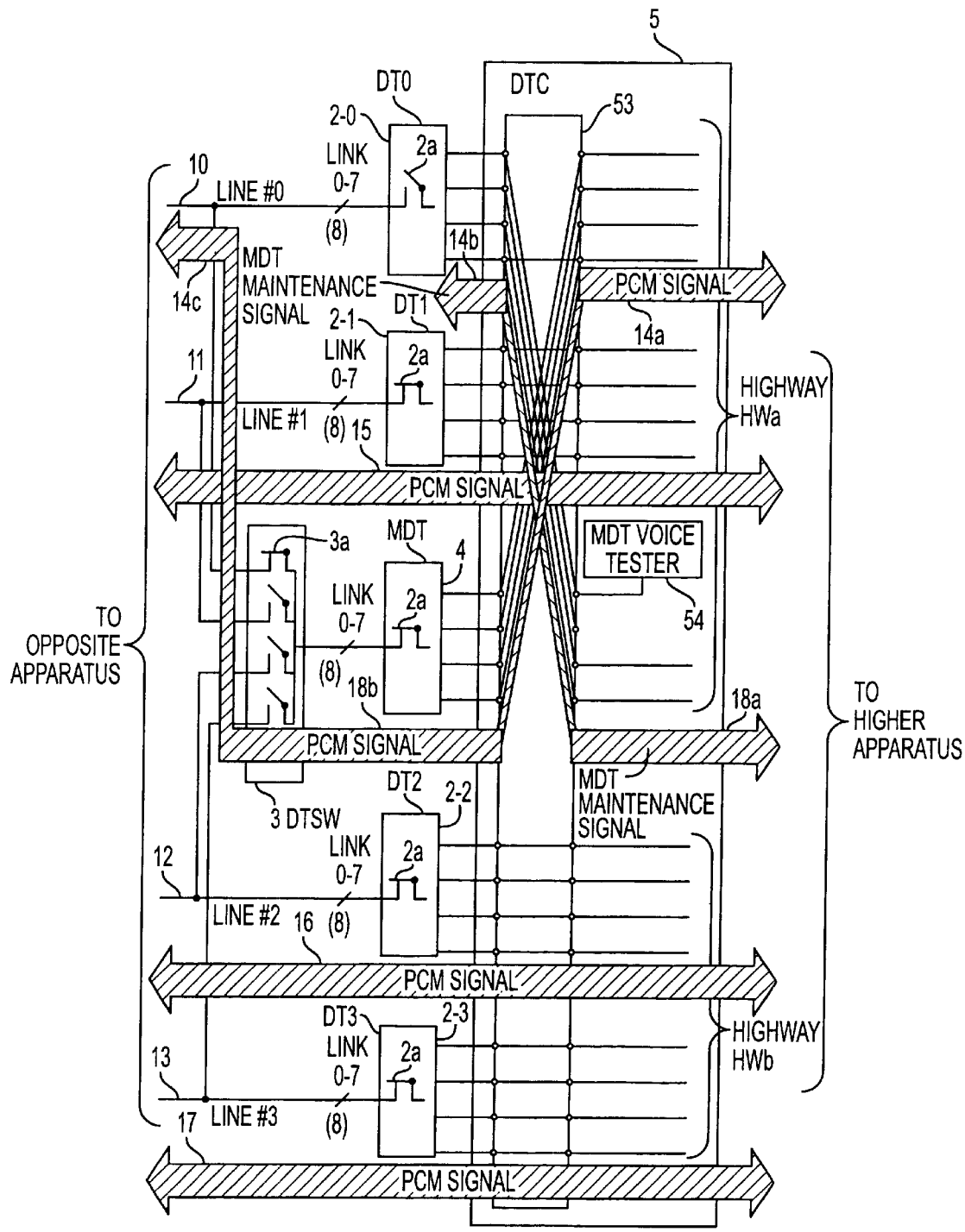
FIGS. 4 and 5 explain the operations of the apparatus of FIG. 3.

FIG. 4 shows an operation of the apparatus of FIG. 3 when the terminating unit DT0 (2-0) connected to the line #0 fails. The reference numerals in FIG. 4 correspond to those in FIG. 3.

The failed terminating unit DT0 sends a failure notice to the controller 8 (FIG. 2) of the higher apparatus 6 through the channel 53c or 53d. The controller 8 issues a maintenance signal to the failed terminating unit DT0 and spare terminating unit 4 through the channels 53c and 53g, or 53d and 53h, to switch the failed terminating unit DT0 to the spare terminating unit 4. Namely, a switch 2a of the failed terminating unit DT0 is opened, and a contact 3a of the line selector 3 is closed to connect the line #0 to the spare terminating unit 4.

The controller 8 also provides the switch 53 with an instruction to make a switch controller (not shown), for the switch 53, connect the channels 53e to 53h of the spare terminating unit 4 to the higher apparatus side of the channels 53a to 53d of the failed terminating unit DT0. As a result, the higher apparatus 6 may communicate voice signals and notification signals with the line #0 through the original channels and spare terminating unit 4.

In this case, the signal route indicated by a hatched line is established. Namely, a PCM signal route 14a on the higher apparatus side is connected to a PCM signal route 18b of the spare terminating unit 4 through the switch 53. The route 18b is passed through the line selector 3 and is connected to a PCM signal route 14c of the line #0.

The switch 53 connects the spare terminating unit 4 to the higher apparatus 6, and in response to an instruction from the controller 8 of the higher apparatus 6, connects the channels 53a to 53d of the failed terminating unit DT0 to the higher apparatus side of the channels 53e to 53h of the spare terminating unit 4. As a result, a maintenance signal route 18a for a maintenance operation confirming signal and a package failure/maintenance signal from the higher apparatus 6 is connected to a maintenance signal route 14b of the channels 53c and 53d of the failed terminating unit DT0. At this time, the channel 53a of the failed terminating unit DT0 is connected to the voice tester 54, and the channel 53b thereof is ignored.

Consequently, the controller 8 of the higher apparatus 6 can acquire failure information from the failed terminating unit DT0 to determine the physical position and conditions thereof and send maintenance signals to the failed terminating unit to control the same.

Figure 5:
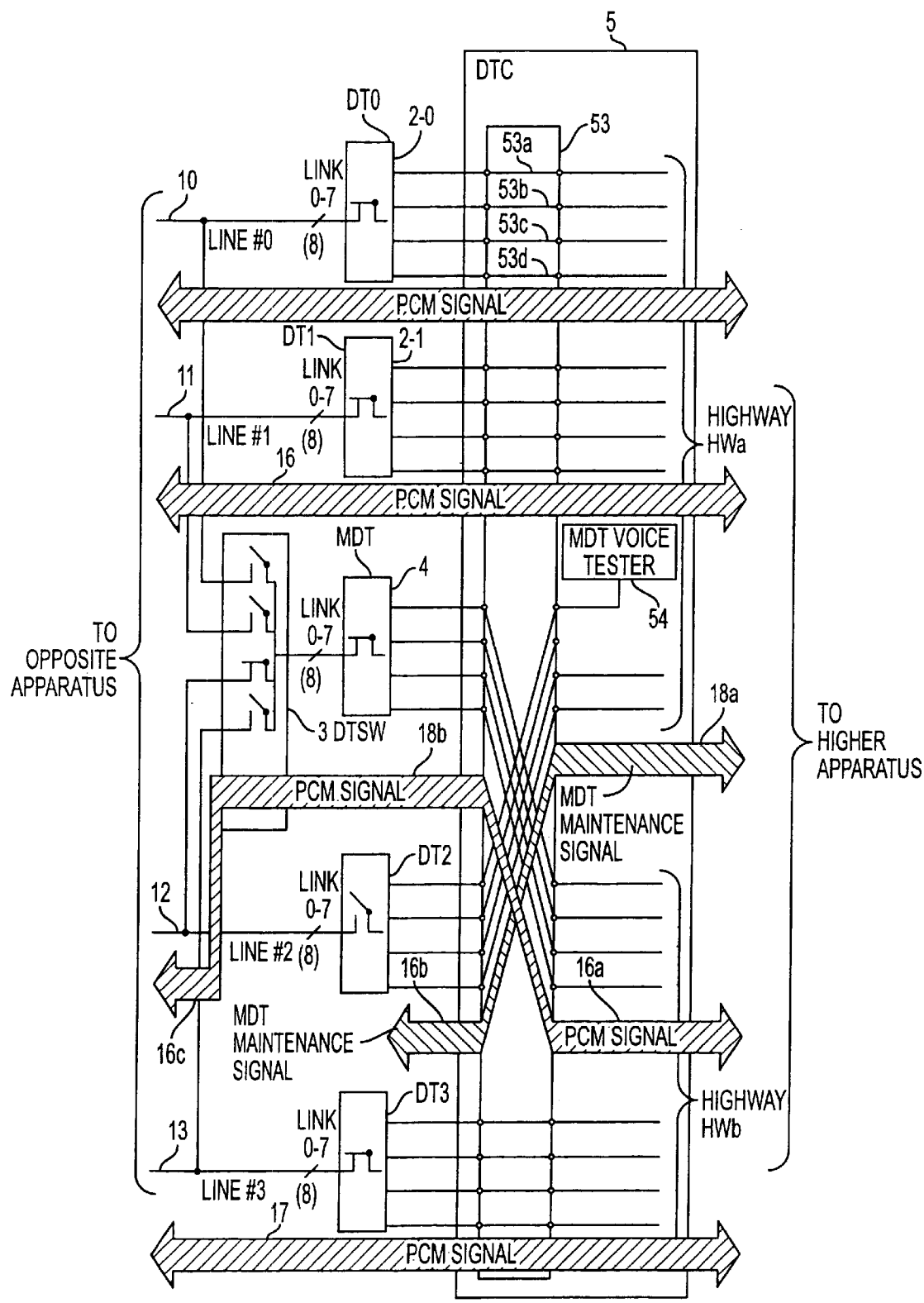

FIG. 5 shows another operation of the apparatus of FIG. 3. In this example, the terminating unit DT2 (2-2) connected to the line #2 (12) fails. Reference numerals in FIG. 5 correspond to those in FIGS. 3 and 4.

The failed terminating unit DT2 sends a failure notice to the controller 8 of the higher apparatus 6 (FIG. 2) through the channel 53c or 53d. Upon receiving the failure notice, the controller 8 sends a maintenance signal to the failed terminating unit DT2 and spare terminating unit 4 through the channels 53c and 53g, or 53d and 53h to switch the failed terminating unit DT2 to the spare terminating unit 4. Namely, a switch 2a of the failed terminating unit DT2 is opened, and a contact 3a of the line selector 3 corresponding to the line #2 is closed to connect the line #2 to the spare terminating unit 4.

At the same time, the controller 8 sends an instruction to the switch 53 to connect the channels 53e to 53h of the spare-terminating unit 4 to the higher apparatus side of the channels 53a to 53d of the failed terminating unit DT2. As a result, the higher apparatus 6 can communicate voice and notification signals with the line #2 through the original channels and spare terminating unit 4.

In this case, a hatched signal route is established. Namely, a PCM signal route 16a on the higher apparatus side of the switch 53 is connected to a PCM signal route 18b of the spare terminating unit 4. The route 18b is passed through the line selector 3 and is connected to a PCM signal route 16c of the line #2. In response to an instruction from the controller 8 of the higher apparatus 6, the switch 53 connects the channels 53a to 53d of the failed terminating unit DT2 to the higher apparatus side of the channels 53e to 53h of the spare terminating unit 4. As a result, a maintenance signal route 18a for a maintenance operation confirmation signal and package failure/maintenance signal from the higher apparatus is connected to a maintenance signal route 16b of the channels 53c and 53d of the failed terminating unit DT2.

As explained above, the interfacing apparatus of the present invention never occupies signal channels for the spare terminating unit among channels for multiplexed signals between the interfacing apparatus and the higher apparatus, thereby improving the efficiency of use of the multiplexed signal channels.

When a failed terminating unit is switched to the spare terminating unit, the present invention assigns main signals and control signals related to the failed terminating unit to the same line (the same time slots) and channels as before the switching. As a result, the higher apparatus can carry out a usual call process without regard to the switching of the failed terminating unit to the spare terminating unit. This reduces the load on the higher apparatus in carrying out the call process.

What is claimed is:

1. A line interfacing apparatus with an N+1 configuration, comprising:

a plurality (N) of regular terminating units for terminating lines, each having an end connected to an opposite apparatus through a corresponding one of the lines and another end connected to a higher apparatus having a switching unit;

at least one spare terminating unit;

a line selector for selecting one of the lines and connecting the selected line to the spare terminating unit; and a termination controller having switches for switching connections between the regular and spare terminating units and the switching unit of the higher apparatus;

wherein, if any one of the regular terminating units fails, the line selector is controlled to switch the line connected to the failed terminating unit to the spare terminating unit, and the switches of the termination controller are controlled to connect signals of the spare terminating unit, in place of signals of the failed terminating unit, to the switching unit of the higher apparatus; and wherein:

each of the regular terminating units separates signals transmitted through the corresponding line into main signals and control signals and supplies the separated signals to the termination controller;

the switches of the termination controller consist of a main signal switch for passing main signals and a control signal switch for passing control signals; and if any one of the regular terminating units fails, main and control signals of the line connected to the failed terminating unit are supplied to terminals of the higher apparatus originally assigned to the line connected to the failed terminating unit through the spare terminating unit and the main signal switch and control signal switch of the termination controller.

2. The line interfacing apparatus of claim 1, wherein:

the termination controller switches a main signal of the spare terminating unit to a terminal of the switching unit of the higher apparatus originally assigned to a main signal of the failed terminating unit and a control signal of the failed terminating unit to a terminal of the switching unit of the higher apparatus originally assigned to the spare terminating unit.

3. The line interfacing apparatus of claim 1, wherein:

the switches of the termination controller are times switches for switching time slots so that, while the failed terminating unit is being switched to the spare terminating unit, the times switches may assign time slots originally assigned to main and control signals of the failed terminating unit to main and control signals of the spare terminating unit.

4. The line interfacing apparatus of claim 2, wherein:

the switches of the termination controller are times switches for switching time slots so that, while the failed terminating unit is being switched to the spare terminating unit, the times switches may assign time slots originally assigned to main and control signals of the failed terminating unit to main and control signals of the spare terminating unit.

5. The line interfacing apparatus of claim 3, wherein:

the termination controller always transmits, to the higher apparatus, hardware identification information and hardware failure information about each terminating unit with a time slot corresponding to the physical position of the terminating unit.

6. The line interfacing apparatus of claim 4, wherein:

the termination controller always transmits, to the higher apparatus, hardware identification information and hardware failure information about each terminating unit with a time slot corresponding to the physical position of the terminating unit.

* * * * *